United States Patent [19]
Hara

[11] Patent Number: 5,772,020
[45] Date of Patent: Jun. 30, 1998

[54] SHEET FOR HOLDING INFORMATION RECORDING CARRIERS

[76] Inventor: Hiroshi Hara, 2-1-216, Shinkawa 2-chome, Chuo-ku, Tokyo 104, Japan

[21] Appl. No.: 776,766

[22] PCT Filed: Jun. 9, 1995

[86] PCT No.: PCT/JP95/01153

§ 371 Date: Feb. 7, 1997

§ 102(e) Date: Feb. 7, 1997

[87] PCT Pub. No.: WO96/41758

PCT Pub. Date: Dec. 27, 1996

[51] Int. Cl.$^6$ .................................................. B65D 85/57
[52] U.S. Cl. .......................... 206/308.3; 281/38; 402/79; 206/472
[58] Field of Search ................................ 206/208.3, 472, 206/425; 402/79; 281/38, 43

[56] References Cited

U.S. PATENT DOCUMENTS

| | | | |
|---|---|---|---|
| 4,193,218 | 3/1980 | Mermelstein | 206/472 |
| 4,395,058 | 7/1983 | Terrell | 281/43 |
| 4,676,374 | 6/1987 | Wilkins | 206/308.3 |
| 4,691,826 | 9/1987 | Ozeki | 206/308.3 |
| 4,724,956 | 2/1988 | Ozeki | 206/308.3 |
| 4,860,897 | 8/1989 | Fowler et al. | 206/308.3 |
| 5,529,183 | 6/1996 | Nishikawa | 206/308.3 |
| 5,540,513 | 7/1996 | Wyant | 281/38 |

FOREIGN PATENT DOCUMENTS

| | | |
|---|---|---|
| 4-5369 | 1/1992 | Japan . |
| 4-5977 | 2/1992 | Japan . |
| 5-84676 | 11/1993 | Japan . |

*Primary Examiner*—Paul T. Sewell
*Assistant Examiner*—Anthony Stashick
*Attorney, Agent, or Firm*—Birch, Stewart, Kolasch & Birch, LLP

[57] ABSTRACT

The present invention relates to a plastic sheet for holding information recording carriers, with which information recording carriers in the form of small disks, such as floppy disks, can be contained under control. In the holding sheet (1) according to the present invention, a pair of hanging members (8,8) for hanging the holding sheet (1) and large and small two types of index strips (7L,7S) are removably formed utilizing bottom plates (4a) of holding cavities (4) for holding information recording carriers. By mounting the index strips (7L,7S) in an insertion groove (3) formed on one side edge of the holding sheet (1), the wanted information recording carrier can be found easily. By mounting the pair of hanging members (8,8) by insertion into mounting holes formed in the vicinities of the both ends of the insertion groove (3), the holding sheet (1) can be hung in a cabinet or the like. Further, by forming a holding groove for holding non-used hanging members (8,8) in the backside of the holding sheet (1), loss of the hanging members can be prevented.

5 Claims, 11 Drawing Sheets

SHEET FOR HOLDING INFORMATION RECORDING CARRIERS

TECHNICAL FIELD

The present invention relates to a sheet for holding information recording carriers, which is used for containing, pigeonholing and storing information recording carriers which are in the form of small thin plates, such as floppy disks and CD-ROM disks. More particularly, the present invention relates to a sheet for holding information recording carriers, which is mainly made of a synthetic resin such as ABS resin, which is suited for being stored in binders and cabinets.

BACKGROUND ART

With the recent progress of information-oriented society, electronic equipments such as various computers and word processors, which deal with characters, symbols and graphic information are now widely used in various fields.

As media for recording characters, symbols and graphic information, which are used with these electronic equipments, information recording carriers such as floppy disks, CD-ROM disks and the like that magnetically record the information, are often used. This is because that floppy disks, CD-ROM disks and the like have large memories, and that each disk is small and thin so that ease of handling of the disk is good.

For pigeonholing and storing information recording carriers such as floppy disks, a holding sheet as disclosed in Japanese Patent Publication (Kokoku) Nos. 4-5369 and 4-5977 is conventionally used.

This holding sheet basically comprises one synthetic resin sheet; a binding margin formed on one side edge of the synthetic resin sheet, which has a plurality of binding holes; a plurality of holding cavities for holding information recording carriers, which are formed in the surface of the synthetic resin sheet; and a pressing strip for holding the information recording carrier, which extends from a side wall of each of the holding cavities into the inner region of the cavity. To ensure ease of putting in and out of the disks, reliability of holding and sufficient strength of the holding sheet, improvements are made, such as providing the bottom plates of the holding cavities with pillar portions, making the cut holes small, and forming guide portions for guiding the information recording carriers.

There is also a conventional holding sheet as disclosed in Japanese Laid-open Utility Model Application (Kokai) No. 5-84676, in which the portions for holding floppy disks are formed on both sides of the sheet such that the portions are rotatably mounted so as to enable removal of the disks from one side, and in which hanging members for hanging the sheet in a cabinet are provided, that are mounted on the upper portions of both sides of the sheet and that can be drawn out from the sheet.

However, with the above-mentioned conventional sheets for holding information recording carriers, there is no measure for identifying each floppy disk at a glance when the holding sheets are stored in a binder or are stored in a cabinet by hanging. Therefore, it is troublesome to identify each floppy disk (information recording carrier) when a floppy disk is to be taken out. Further, the conventional information recording carries have drawbacks in that their structures are complicated, forming the sheets by molding is troublesome, and costs for producing the sheets are high.

Accordingly, an object of the present invention is to provide a sheet for holding information recording carriers that overcomes such drawbacks of the conventional sheets for holding information recording carriers, that has indices which enables a person to easily find the desired information recording carrier such as a floppy disk held in the sheet.

Another object of the present invention is to provide a sheet for holding information recording carriers, which has a relatively simple structure, and which can be produced at a low cost.

Still another object of the present invention is to provide a sheet for holding information recording carriers, which may be contained in any of a binder, cabinet, file box and the like by using hanging members formed by utilizing a part of the surface of the sheet, the hanging members being held in a holding groove formed in the sheet when they are not used, thereby preventing the hanging members from being lost.

DISCLOSURE OF THE INVENTION

The sheet for holding information recording carriers according to the present invention comprises a binding margin formed on one side edge of the sheet; a plurality of holding cavities for holding information recording carriers, which are formed in the surface of the sheet; and a pressing strip for holding the information recording carrier, which extends from a side wall of each of the holding cavities into the inner region of the cavity. In the sheet according to the present invention, a pair of hanging members are removably formed in at least one bottom plate of the holding cavities utilizing a part of the bottom plate; and index strips are removably formed utilizing parts of one or more of the other bottom plates. An insertion groove for mounting the removed index strips is formed on the side edge opposite to that on which the binding margin is formed, and insertion holes for inserting the removed pair of hanging members are formed in the vicinities of the ends of the insertion groove. Further, the sheet has a holding groove for holding each of the hanging members when they are not used.

Thus, according to the present invention, by removing the index strip from the bottom plate and mounting it by inserting it into the insertion groove, one can easily identify the information recording carrier contained in the holding cavity in the holding sheet. Especially, by providing large and small two types of index strips, the larger index strips having a length corresponding to the width of the holding cavities, and the smaller index strips having a length about half of the larger index strips, the type of the index strip can be selected depending on the information recording carrier to be held in the sheet, which is convenient.

The index strip comprises a portion to be inserted into the insertion groove and a display surface for displaying characters and the like. The index strip is removably provided by cutting a part of the bottom plate. Therefore, when the index strip is not used, it is used as a part of the bottom plate, so that there is no possibility for the index strip to be lost. When the index strip is used, it is conveniently removed from the bottom plate by cutting connection portions. Further, a plurality of index strips may be formed in each bottom plate, thereby forming the index strips in a number more than that actually used. By so doing, the remaining index strips may be used as spares.

The index strip is so formed that the side of the portion to be inserted is made wider. On the other hand, the insertion groove is so formed that the size of the groove corresponds to the size of the index such that its side of opening is narrower and the side of the bottom is wider. The index strip is inserted into the insertion groove from an end of the groove and slid along the groove until it is located at the desired position. Thus, the index strips may be rearranged as required, and the location of an index strip may be changed in accordance with the location of the corresponding information recording carrier held. By mounting the index strips like this, the desired information recording carrier may very easily be taken out when the holding sheet is bound in a binder or hung in a cabinet.

Since a pair of hanging members for hanging the holding sheet are formed utilizing a part of the bottom plate of a holding cavity, the hanging members can be used as a part of the bottom plate without being detached when they are not used, so that the possible loss thereof can be avoided. The hanging members can be detached when they are used, which is very convenient. By virtue of the hanging members, the holding sheet may be contained not only in binders but also in cabinets or the like.

When once detached hanging members are not used, they may be retained in a holding groove formed in the backside of the holding sheet.

The hanging member has a hook portion at which it is hung, and an insertion-mounting portion to be inserted into a mounting hole. On the insertion-mounting portion of the hanging member, an abutting projection is formed. On the other hand, in the mounting hole, an abutting member is formed, which abuts the abutting projection so as to prevent the insertion-mounting portion from being slipped off. Thus, the hanging member is inserted and firmly mounted in the mounting hole, so that it is not slipped off easily.

The holding groove for holding the non-used hanging members is constituted by a groove formed in the side edge on which the insertion groove is formed and by a notch formed in a part of the side wall of a holding cavity adjacent to the groove, so that the structure is simple and the hanging member can be placed easily.

By virtue of the above-described constitution, the sheet for holding information recording carriers according to the present invention has the following excellent advantageous effects.

(1) When the sheet for holding information recording carriers is filed in a binder or hung in a cabinet, the desired information recording carrier such as a floppy disk, CD-ROM disk, magneto-optical disk or the like can easily be identified by virtue of the index strip. Especially, by providing large and small two types of index strips, the index strip may be selectively used as required, which is convenient.

(2) The sheet for holding information recording carriers has a comparatively simple structure, and the index strips and the hanging members are formed by utilizing the bottom plate of the holding sheet. Therefore, the holding sheet can be produced by injection molding easily, so that the holding sheet is suited for large scale production and the production cost is low.

(3) Since mounting holes are formed in the vicinities of both ends of the insertion groove formed in the side edge, and hanging members for hanging the holding sheet in a cabinet or the like are inserted in the mounting holes, the hanging members may be firmly mounted. By virtue of the hanging members, the holding sheet may be contained not only in a binder but also in a cabinet or the like.

(4) Since a holding groove for holding non-used hanging members is formed in the backside of the holding sheet, the hanging members may be retained in the holding groove when they are not used, so that the possible loss of the hanging members can be avoided.

BEST MODE FOR CARRYING OUT THE INVENTION

Figure 1:
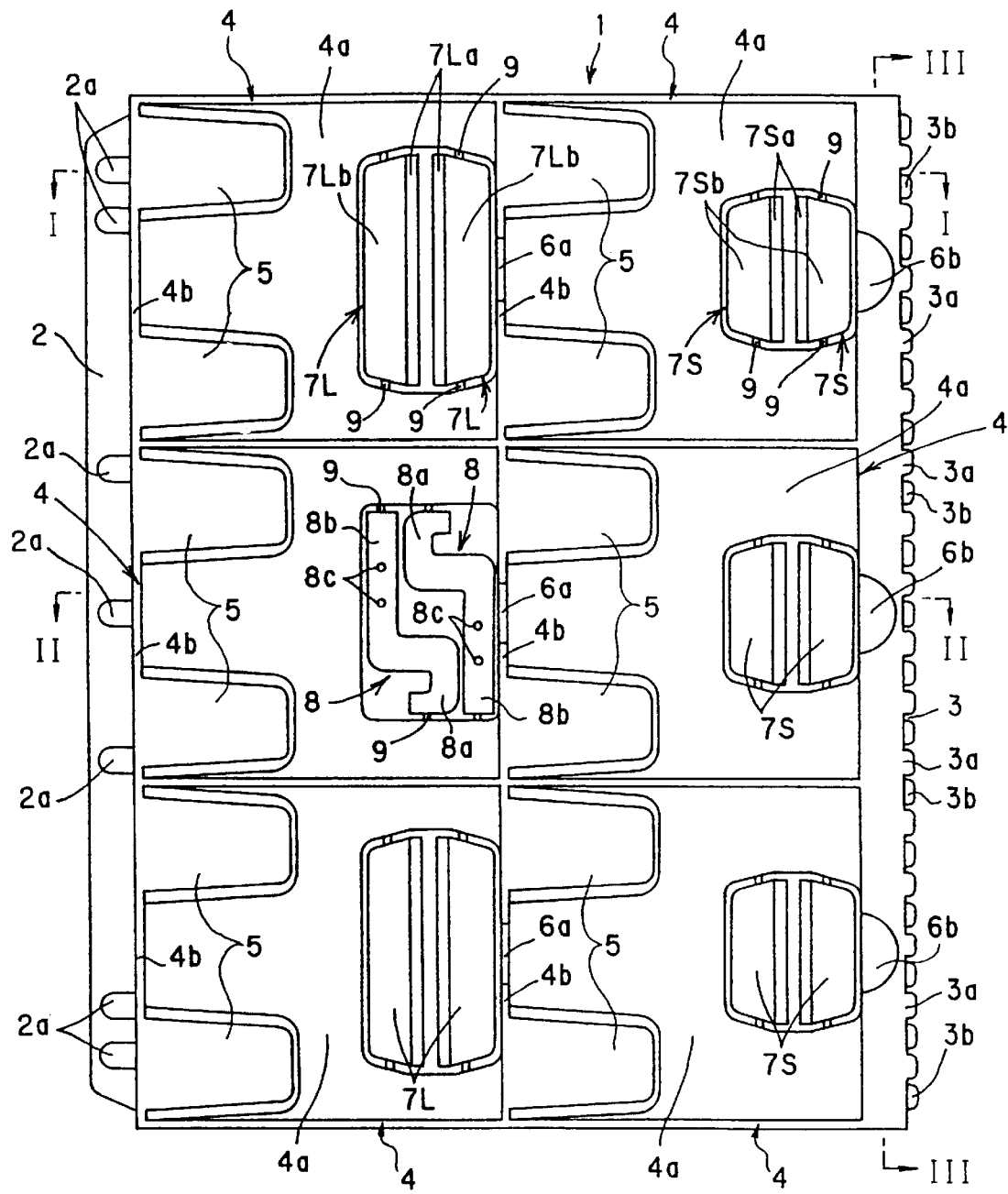
FIG. 1 is a front view showing one embodiment of the sheet for holding information recording carriers according to the present invention.

The present invention will now be described in more detail referring to the accompanying drawings.

FIGS. 1–9 show the structure of the sheet for holding information recording carriers according to the present invention, which has index strips. A holding sheet 1 produced by filling by injection a synthetic resin such as ABS resin melted by heating into molds, cooling the resin to solidify the same and releasing the solidified resin from the mold, has receiving portions for holding information recording carriers 10 such as 3.5 inches floppy disks and CD-ROM (the term "CD-ROM" herein means the circular CD-ROM disk enclosed in a square jacket), which receiving portions are arranged in 2 columns and 3 lines. The holding sheet has a binding margin 2 having a plurality of binding holes 2a at one side edge (the left side in the front view shown in FIG. 1). The holding sheet also has an insertion groove 3 formed by two rows of a plurality of projections 3a, 3b which constitute side walls of the insertion groove 3, the projections being formed on the other side edge (the right side in the front view shown in FIG. 1).

Each rectangular holding cavity 4 serving as the receiving portion of the information recording carrier has a bottom plate 4a and bordered by substantially vertical surrounding walls. On the side of the binding margin 2 of the surrounding walls, that is, on the side wall 4b of the each cavity, a pair of (two) pressing strips 5 for holding the information recording carrier, which are formed on the both end portions of the side wall 4b keeping a prescribed distance therebetween and which extend to the inside of the holding cavity are formed. To make it easy to take out the information recording carrier 20 contained in a holding cavity 4, a notch 6a or a finger cavity 6b in the form of an arc is formed in a side wall of each of the holding cavities (see FIGS. 1 and 6).

The pressing strip 5 is made during the injection molding utilizing a part of the bottom plate 4a. The portion of the bottom plate facing the surface of the pressing strip is open. The pressing strip 5 has an elasticity and strength sufficient for holding the information recording carrier 20 held. The tip 5a of the pressing strip 5 is outwardly curved so as to make it easy to insert the information recording carrier 20 (see FIGS. 2 and 3). Since a pair of (two) pressing strips 5,5 are formed in each cavity keeping a prescribed distance therebetween, the slide cover portion 20*a* does not contact the pressing strips even if an information recording carrier 20 such as a floppy disk is repeatedly placed in and taken out from the cavity, so that smooth movement of the slide cover portion 20*a* is not deteriorated.

Figure 2:
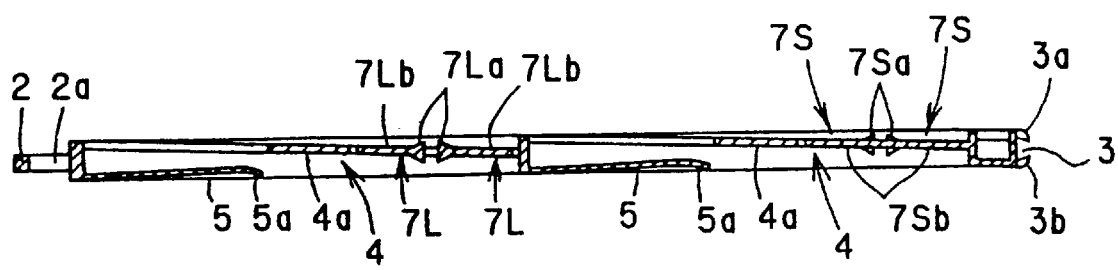
FIG. 2 is a cross-sectional view taken along A—A line in FIG. 1.
Figure 3:
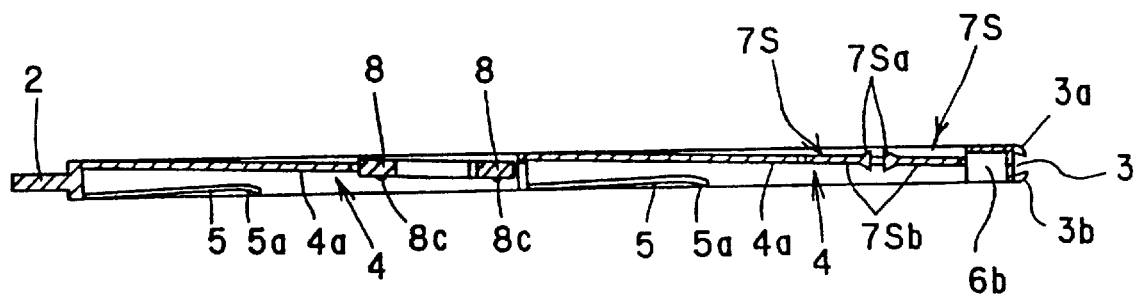
FIG. 3 is a cross-sectional view taken along B—B line in FIG. 1.
Figure 4:
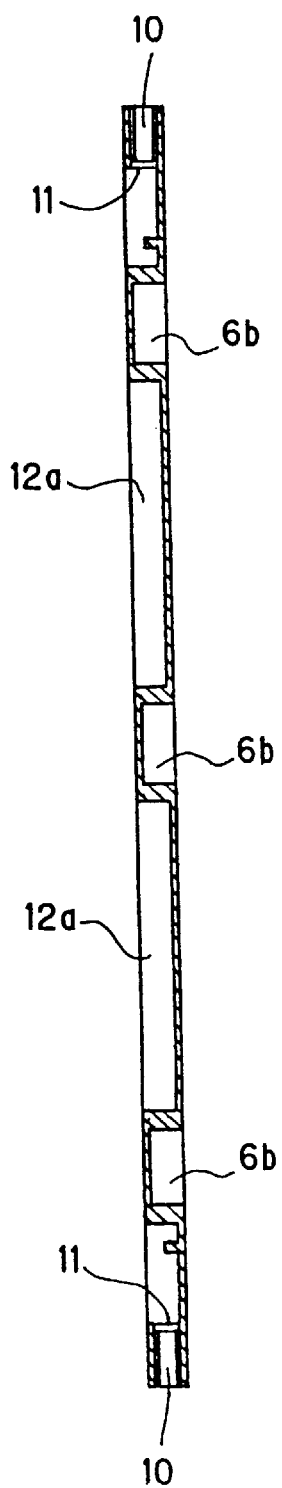
FIG. 4 is a cross-sectional view taken along A—A line in FIG. 1.

The bottom plate 4*a* of each holding cavity 4 is sloped such that the side from which the information recording carrier 20 is inserted is higher and the side of the wall on which the pressing strips 5 are formed is lower, so as to enhance ease of insertion as well as stable holding and ease of removal after placing the information recording carrier (see FIGS. 2 and 3).

Especially, by virtue of the fact that the side from which the information recording carrier is inserted is made higher and by virtue of the above-mentioned notch 6*a* or finger cavity 6*b*, end of the held information recording carrier 20 can be exposed to outside of the holding cavity 4, so that the information recording carrier 20 can be easily removed by hooking a finger on the end of the information recording carrier. In order to make the hooking of the finger easier, the finger cavity 6*b* is preferably a little deeper than the bottom plate 4*a* of the insertion side.

Figure 5:
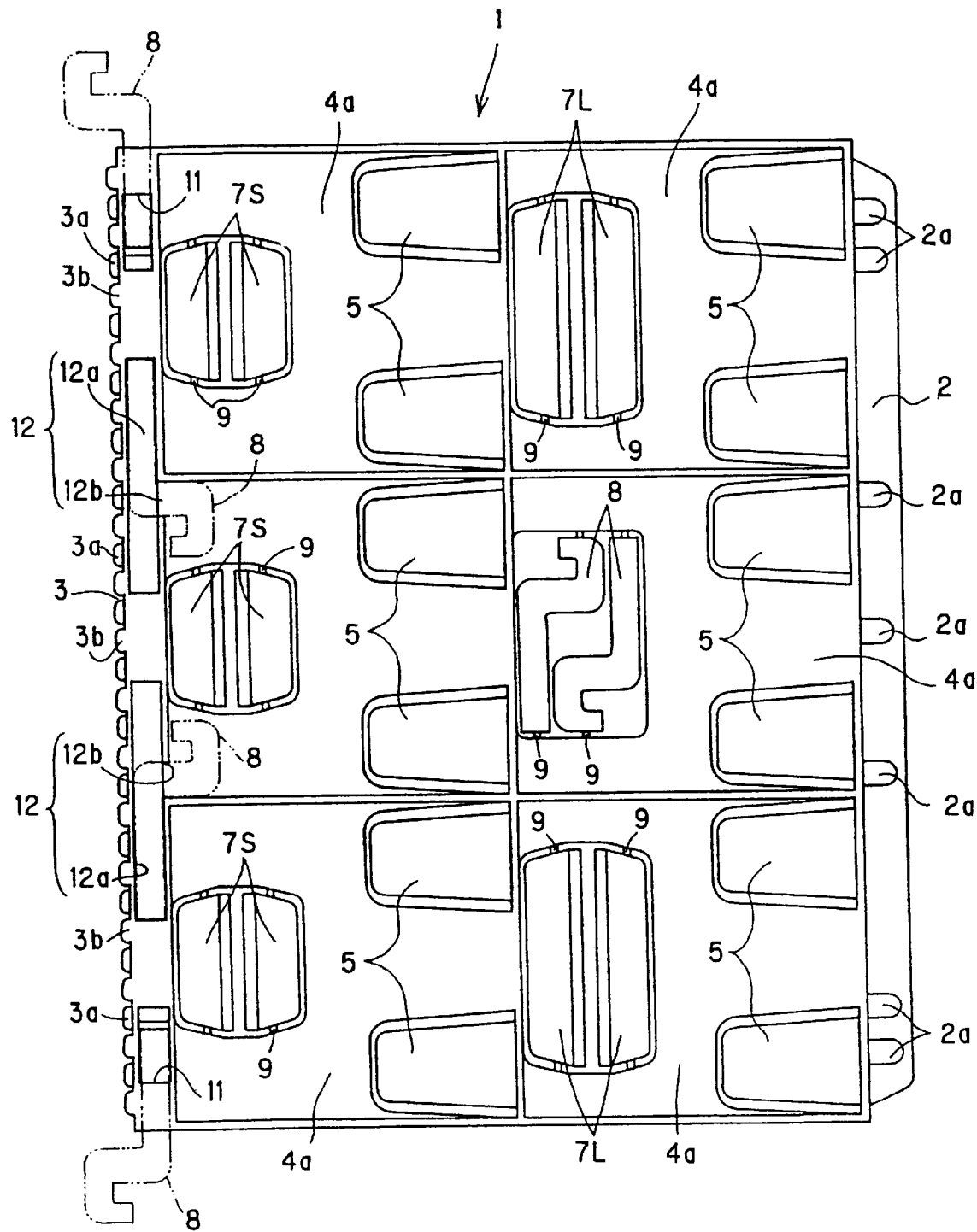
FIG. 5 is a back view showing one embodiment of the sheet for holding information recording carriers according to the present invention.
Figure 6:
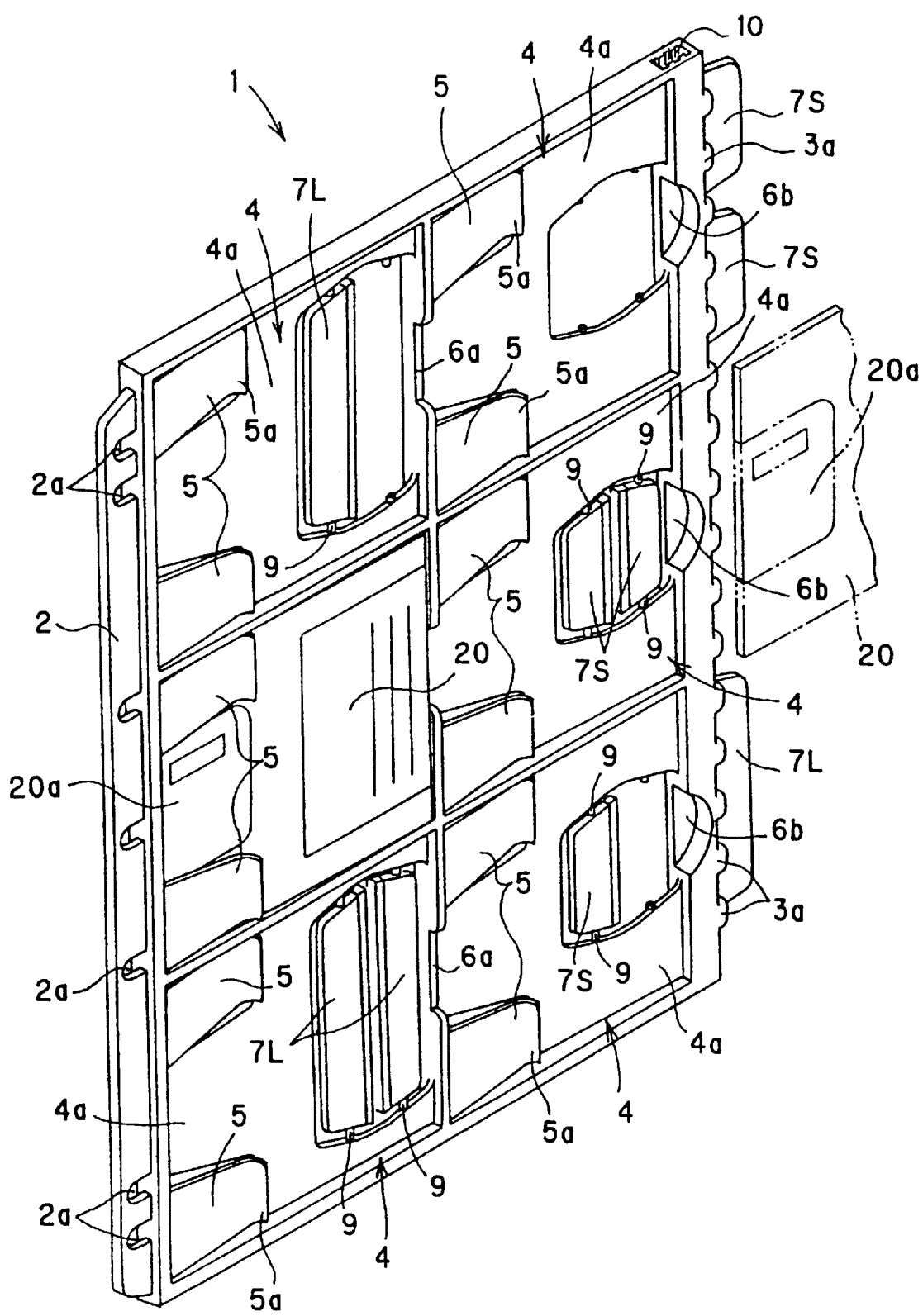
FIG. 6 is a perspective view showing the state of use of the holding sheet of the embodiment shown in FIG. 5.

As shown in FIGS. 1, 5 and 6 in detail, in the sheet 1 for holding information recording carriers according to this embodiment, large and small two types of index strips 7L,7S are formed. Among the large and small two types of index strips 7L and 7S, the larger index strips 7L have a length similar to the width of the holding cavities. Thus, totally three large index strips 7L can be mounted in the insertion groove 3, so that each index strip can indicate the contents of each line, the holding sheet having three lines. The small index strips 7S have a length of about half of the large index strips 7L. Thus, totally six small index strips 7S can be mounted in the insertion groove 3, so that the contents of each line can be indicated by two small index strips, the holding sheet having three lines. The large and small index strips 7L and 7S may be used in combination.

The entire shape of the index strips 7L,7S is substantially trapezoidal, and insertion portions 7L*a*, 7S*a* to be inserted into the insertion groove 3 are formed such that the tips thereof are wider. The front and back surfaces of the index strips 7L,7S are display surfaces 7L*b*, 7S*b* for displaying characters and the like. The index strips 7L,7S are formed utilizing parts of the bottom plates 4*a* during injection molding, and are provisionally connected to the bottom plates 4*a* through right and left connection portions 9. Thus, when the index strips 7L,7S are to be used, they can easily be removed by clamping the index strips 7L,7S with fingers and breaking the connection portions 9.

Figure 7:
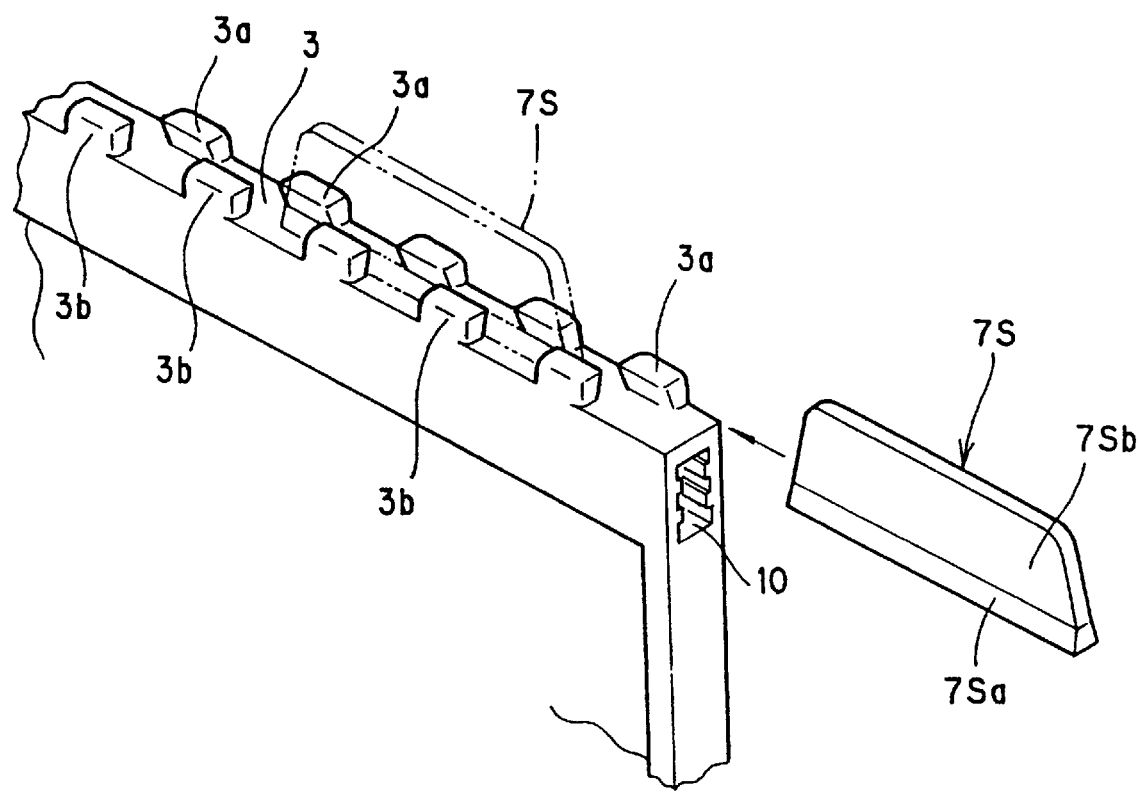
FIG. 7 is a perspective view showing how to mount the index strip on the sheet for holding information recording carriers.

As shown in FIGS. 2, 3 and 7 in detail, the insertion groove 3 is formed such that the side of the opening is narrower and the side of the bottom of the groove is wider, so as to correspond to the insertion portions 7L*a*, 7S*a* of the index strips 7L,7S. By virtue of this, as shown in FIG. 7, the insertion portions 7L*a*, 7S*a* of the index strips whose tips are wider can be inserted into the insertion groove 3 from an end of the insertion groove, and the inserted index strips are prevented from being fallen out.

The both side walls constituting the insertion groove 3 are formed such that each of the side walls is alternately cut off such that the side walls do not overlap when viewed from the front side and from the backside. That is, the side walls constituting the insertion groove 3 are constituted by a number of projection strips 3*a* and 3*b* which are alternately arranged. By virtue of such a structure, the insertion groove can be formed by injection molding in which the mold is moved in only one direction perpendicular to the plane of the holding sheet. In spite of such a structure, since the insertion groove can be formed by a number of projection strips 3*a* and 3*b*, there is no problem on the strength of the insertion groove.

The index strips 7L,7S formed as mentioned above are inserted into the insertion groove 3 from an end of the insertion groove and slid along the insertion groove to the desired position (see FIG. 7). The positions of the index strips 7L,7S can be optionally selected depending on the positions of the information recording carriers 20 to be tagged.

As shown in FIGS. 1 and 5 in detail, in the remaining one bottom plate 4*a*, a pair of hanging members 8,8 for hanging the holding sheet 1 in a cabinet or the like are formed. Each of the hanging members 8,8 has a hook portion 8*a* at which the hanging member is hung and an insertion-mounting portion 8*b* formed integrally with and adjacent to the hook portion 8*a*. The insertion-mounting portion 8*b* has abutting projections 8*c*, 8*c*. The hanging member 8 is integrally formed with the bottom plate 4*a* utilizing a part of the bottom plate 4*a* during injection molding, and is provisionally connected to the bottom plate 4*a* through right and left connection portions 9. Thus, when the hanging members are to be used, they can easily be removed by clamping the hanging member 8 with fingers and breaking the connection portions 9.

Figure 8:
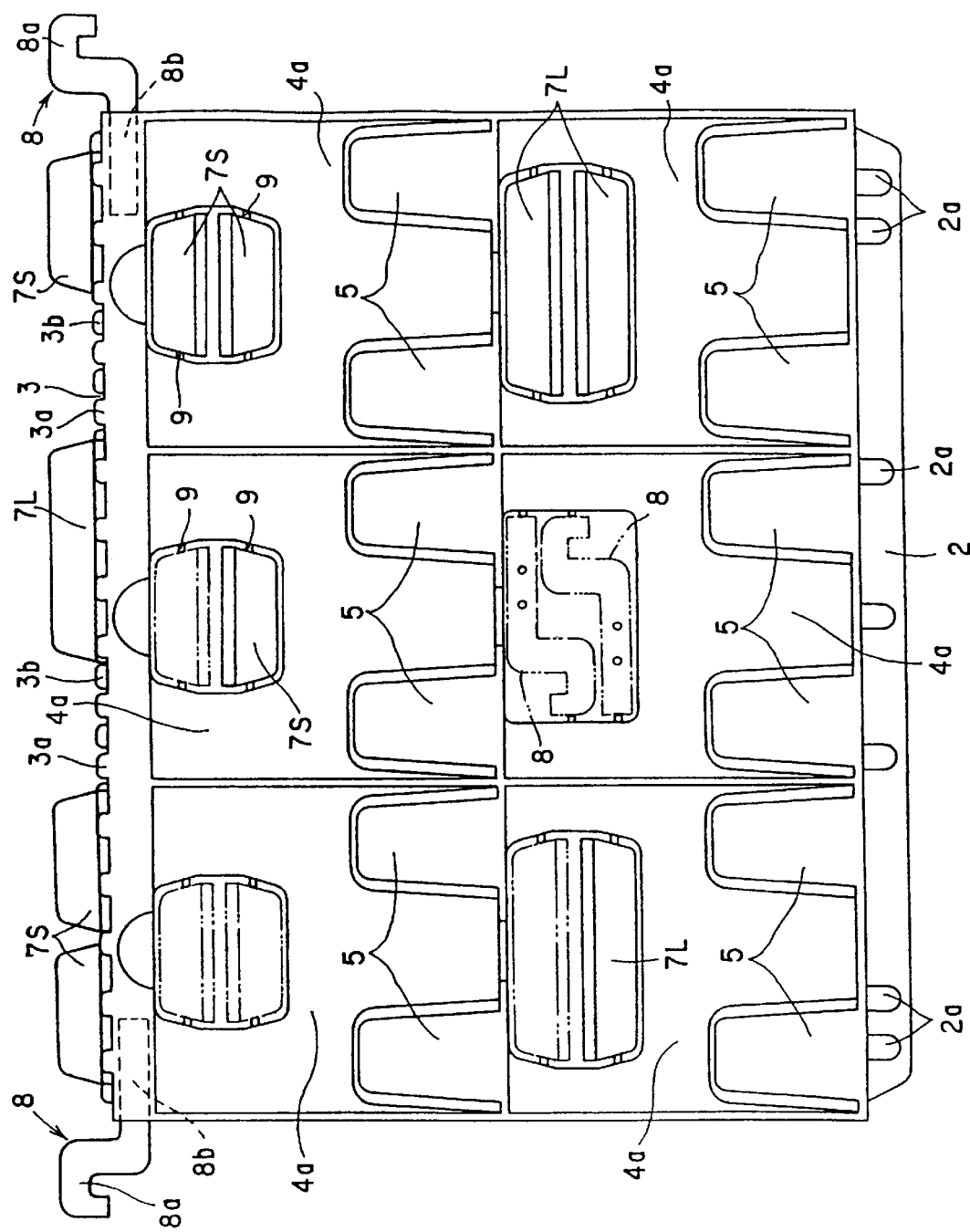
FIG. 8 is a front view showing the state wherein the hanging members are mounted on the sheet for holding information recording carriers.
Figure 9:
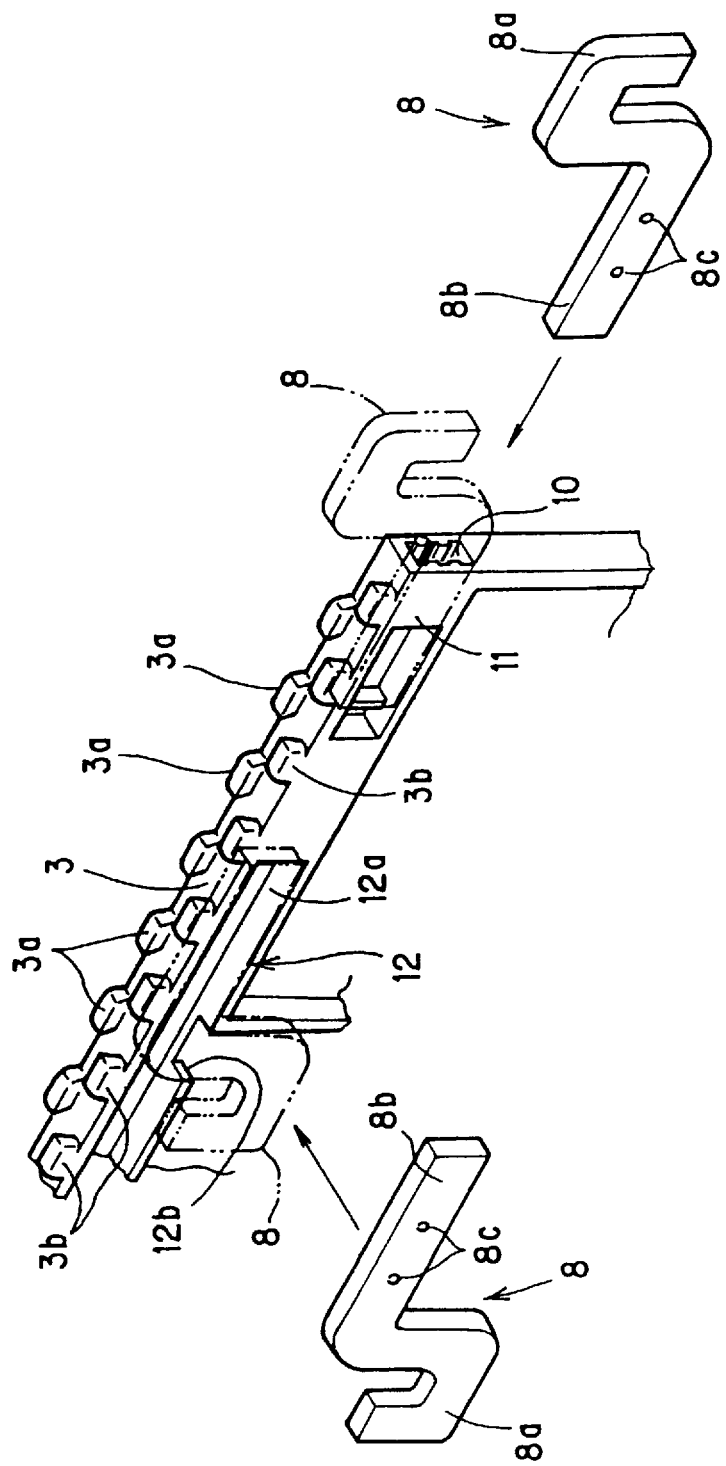
FIG. 9 is a perspective view showing how to mount and how to hold the hanging members.

As shown in FIGS. 8 and 9 in detail, the pair of hanging members 8,8 are firmly mounted by inserting the insertion-mounting portions 8*b*, 8*b* thereof into the mounting holes 10, 10 formed in the vicinities of both end portions of the insertion groove 3 of the holding sheet 1. An abutting member 11 which abuts the abutting projections 8*c*, 8*c* of the inserted insertion-mounting portion 8*b* is formed in each mounting hole 10 (see FIGS. 4 and 9). In this embodiment, two abutting projections 8*c* are formed on each insertion-mounting portion 8*b*, so that the depth of insertion of the hanging member may be adjusted in two levels. As a result, the distance between the hanging members may be adjusted so as to correspond to the width of the cabinet or the like. The adjustment of the distance between the hanging members is not restricted to two levels, but multiple levels of adjustment may be attained by providing three or more abutting projections or by providing projections in the form of teeth of saw.

There may be cases in which the hanging members 8,8 are once detached from the bottom plate 4*a* but are not used for some reason or another. Taking such a case into consideration, according to the present embodiment, holding grooves 12, 12 for holding the non-used hanging members 8,8 are formed in the backside of the holding sheet 1 (see FIG. 9). The holding groove 12 is constituted by a resin-omitting groove 12*a* formed by omitting the resin constituting a part of the solid structure (i.e., the groove 12*a* is formed by omitting the resin constituting a part of the otherwise solid margin portion, which is carried out for the purpose of reducing the weight and preventing distortion) and by a notch 12*b* formed in the side wall of the holding cavity adjacent to the resin-omitting groove 12*a*. As shown in FIGS. 8 and 9, each hanging member 8 is inserted in the holding groove 12. Thus, the hanging members 8,8 are not lost even when they are not used.

As described above, the sheet 1 for holding information recording carriers according to the present embodiment has a relatively simple structure and the index strips 7L,7S and the hanging members 8,8 are formed by utilizing bottom plates 4a of the holding sheet 1. Therefore, the sheet can be produced easily by injection molding in one time and the production cost is low.

How to use the sheet 1 for holding information recording carriers described above will now be described concretely referring to FIGS. 10 to 12.

Figure 10:
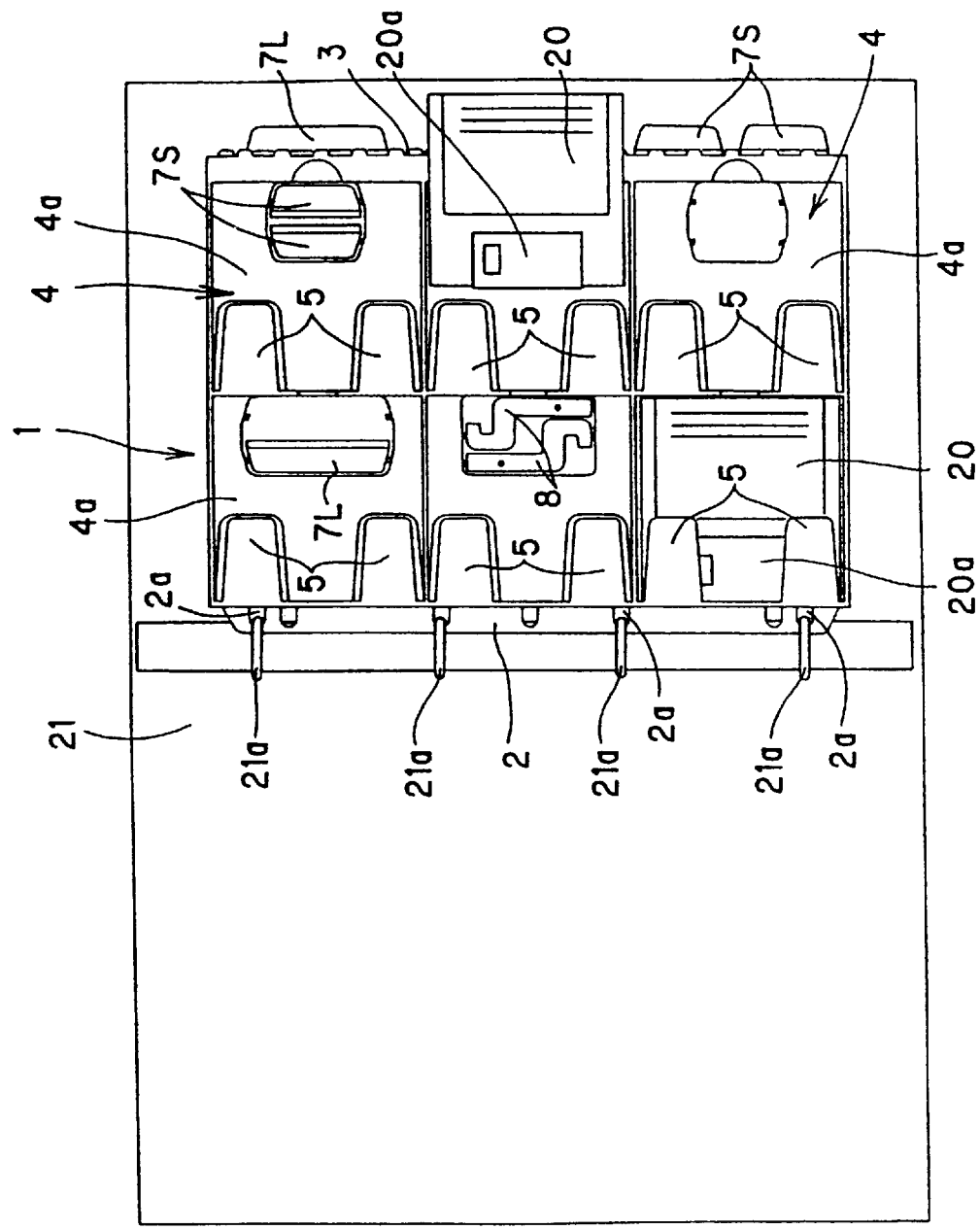
FIG. 10 is a view showing the state wherein the sheet for holding information recording carriers is filed in a binder.

FIG. 10 shows the state in which the sheet 1 for holding the information recording carriers according to the present embodiment is bound in a binder 21 via rings 21a. In this case, the hanging members 8,8 are not used.

Thus, by inserting the rings 21a of the binder 21 into the binding holes 2a of the binding margin provided in one side of the sheet, a plurality of the sheets can be filed in the binder 21. In this case, by inserting the index strips 7L,7S into the insertion groove 3 formed on the other edge of the sheet, the information recording carriers 20 held can be indicated. Thus, the needed information recording carrier 20 can be easily found at a glance.

In this embodiment, since the left side of the sheet is bound, the information recording carrier 20 such as a floppy disk is inserted into and taken out from the holding cavity 4 through the right side of the cavity. In the state in which the sheet is bound in the binder 21, the pressing strips 5,5 are positioned on the left side of the cavity and not on the lower side of the cavity. However, since the information recording carrier 20 is surrounded by the side walls of the cavity and is urged against the bottom plate 4a by the elastic pressing strips 5,5, the information recording carrier is not fallen out and securely held. Since a pair of (two) pressing strips 5,5 are formed in each cavity keeping a prescribed distance therebetween, the slide cover portion 20a does not contact the pressing strips even if an information recording carrier 20 such as a floppy disk is repeatedly placed in and taken out from the cavity, so that smooth movement of the slide cover portion 20a is not deteriorated.

Figure 11:
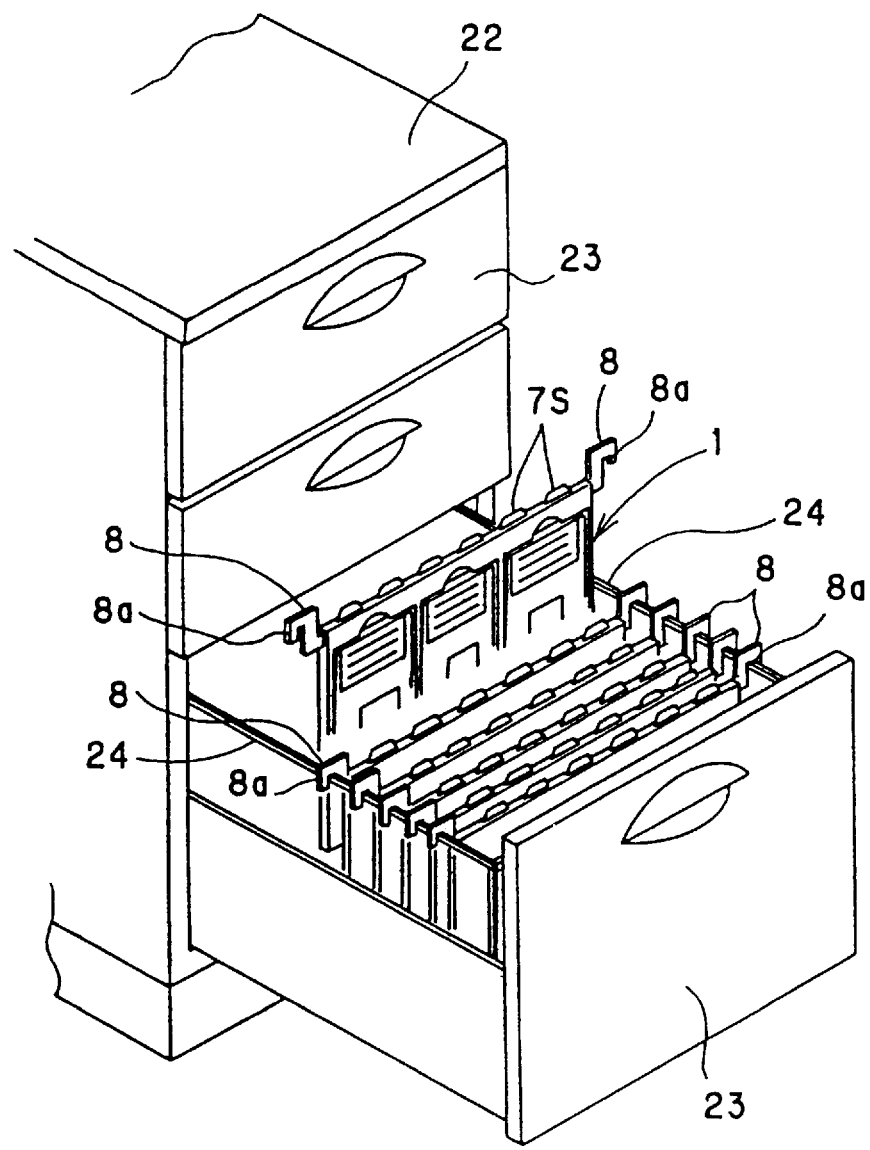
FIG. 11 is a perspective view showing the state wherein the sheets for holding information recording carriers are hung using the hanging members.
Figure 12:
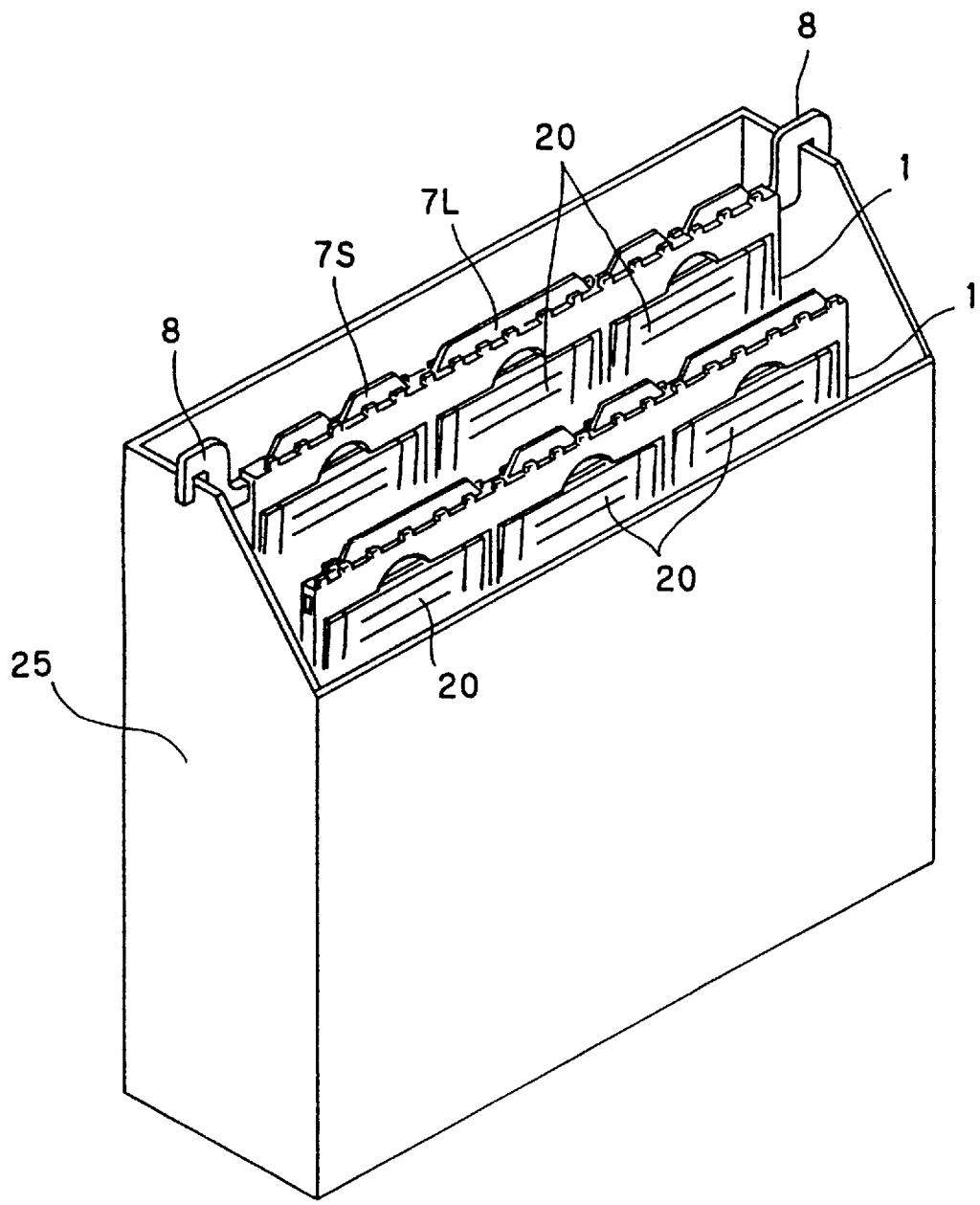
FIG. 12 is a perspective view showing the state wherein the sheets for holding information recording carriers are contained in a box file using the hanging members.

FIGS. 11 and 12 are views for explaining the case wherein the hanging members 8,8 removably formed integrally with the bottom plate 4a are mounted. For example, FIG. 11 shows the state wherein the holding sheet 1 is contained in a cabinet 22 made of a metal.

In this embodiment, to make it possible to be contained in a cabinet 22 or the like by hanging, the holding sheet 1 is used such that the side on which the index strips are mounted is upside, and the hanging members 8,8 are firmly mounted by inserting the insertion-mounting portion 8b,8b of the hanging members 8,8 into the mounting holes 10,10 formed in the vicinities of the both ends of the insertion groove 3 formed on the side edge of the holding sheet 1 (see FIGS. 8 and 9). After inserting the insertion-mounting portions 8b,8b of the hanging members 8,8 into the mounting holes 10,10 formed in the vicinities of the both ends of the holding sheet, the hook portions 8a,8a of the hanging members 8,8 are hung on the filing rails 24 or the like provided in a drawer 23 of the cabinet 22 as shown in FIG. 11, thereby hanging the holding sheet 1 in the cabinet 22. By using the holding sheets as mentioned above, the sheets 1 for holding information recording carriers according to this embodiment can be contained by arranging the holding sheets in a row in the cabinet made of a metal.

The distance between the hook portions 8a,8a may be changed more or less by adjusting the depth of insertion of the insertion-mounting portions 8b,8b in the mounting holes 10 by selecting the two abutting projections 8c,8c on the each mounting-insertion portion, so that the holding sheets may be hung in cabinets having varying widths.

When the holding sheets are contained in the cabinet 22 in this manner, the index strips 7L,7S are positioned at the uppermost sides of the holding sheets 1. Therefore, when the drawer 23 of the cabinet 22 is opened, the wanted information recording carrier 20 can be easily found at a glance. In this case, the information recording carriers 20 are not dropped even if the drawer 23 of the cabinet 22 is roughly opened and closed, because the pressing strips 5,5 are positioned at the lower sides of the cavities, the information recording carriers 20 are surrounded by side walls of the cavities and are strongly urged against the bottom plates 4a by the elastic pressing strips.

The sheet 1 for holding information recording carriers can be contained in a box file 25 by using the hanging members 8,8. That is, as shown in FIG. 12, the holding sheet 1 can be hung by hooking the hanging members 8,8 on the upper edge of the side walls of a commercially available box file 25; or by removing the hanging members 8,8 and placing the holding sheets as they are in the box file. In this case, by virtue of the index strips 7L,7S located at the upper ends of the sheets, the wanted information recording carrier 20 held in the holding sheets can be easily found.

To indicate an information recording carrier 20, the same symbol or the same sign as placed on the information recording carrier 20 may also be placed on the index strip 7L,7S. Alternatively, for example, the index strips can be distinguished by assigning different colors. It is preferred to give serial numbers to a plurality of holding sheets 1 and to give the same numbers to the information recording carriers 20 held in the respective holding sheet.

Although the holding cavities 4 are formed in 2 columns and 3 lines in this embodiment, the number of the holding cavities is not restricted to this, and may be appropriately changed depending on the size of the information recording carriers 20. The entire size of the holding sheet is preferably one which can be contained in commercially available binders, for example, JIS A4 (width 21 cm, length 29.7 cm).

In order to ensure elasticity and sufficient strength (impact resistance and durability), it is preferred to form the holding sheet 1 according to the present invention with a synthetic resin such as ABS resin or polypropylene, preferably ABS resin. In the holding sheet 1, binding holes 2a for binding the holding sheet in the binder 21 are formed in the binding margin 2. However, in addition thereto, or instead thereof, a rib having rounded edges may be formed in the longitudinal direction of the binding margin 2. By so doing, the holding sheet may be bound in a binder having a binding device including an opened slit in the longitudinal direction, into which the above-mentioned rib may be inserted.

INDUSTRIAL AVAILABILITY

As described above, the sheet for holding information recording carriers according to the present invention is useful for containing, pigeonholing and storing the information recording carriers in the form of a small thin plate, such as floppy disks, CD-ROM and magneto-optical disks, and is especially suited for being contained in binders, cabinets or box files.

I claim:

1. A sheet for holding information recording carriers comprising a binding margin formed on one side edge of said sheet; a plurality of holding cavities for holding information recording carriers, which are formed in the surface of said sheet; and a pressing strip for holding said information recording carrier, which extends from a side wall of each of said holding cavities into the inner region of said cavity;

characterized in that a pair of hanging members for hanging said sheet in a container such as a cabinet are removably formed in bottom plate of at least one of said holding cavities utilizing a part of the bottom plate; that one or more index strips are removably formed in bottom plate of one or more of the other holding cavities; that an insertion groove for mounting the removed index strips is formed, which groove is formed on the side edge opposite to that on which said binding margin is formed; that mounting holes for inserting said pair of hanging members removed from said bottom plate are formed in the vicinities of both ends of said insertion groove; and that one or more holding grooves for holding non-used hanging members are formed in the backside of said holding sheet.

2. The sheet for holding information recording carriers according to claim 1, characterized in that said index strips include large and small two types of index strips, the larger one having a length corresponding to the width of said holding cavity, the smaller one having a length half of the larger one.

3. The sheet for holding information recording carriers according to claim 1, characterized in that said one or more index strips are so formed that the side of the portion to be inserted is made wider; and that the insertion groove is so formed that the size of the groove corresponds to the size of the index strip such that its side of opening is narrower and the side of the bottom is wider, said index strip being slid in and along said insertion groove when it is used.

4. The sheet for holding information recording carriers according to claim 1, characterized in that each of said hanging members has a hook portion at which said hanging member is hung and an insertion-mounting portion to be inserted into said mounting hole; that said insertion-mounting portion has one or more abutting projections; and that an abutting member which abuts said abutting projection so as to prevent said hanging member from being slipped off is formed in said mounting hole.

5. The sheet for holding information recording carriers according to claim 1, characterized in that said holding groove for holding non-used hanging member is constituted by a resin-omitting groove formed in the side edge on which said insertion groove is formed and by a notch formed in a part of the side wall of a holding cavity adjacent to said resin-omitting groove.

\* \* \* \* \*